US011416785B2

(12) United States Patent
Kochura et al.

(10) Patent No.: US 11,416,785 B2
(45) Date of Patent: Aug. 16, 2022

(54) AUTOMATED INTERACTIVE SUPPORT

(71) Applicant: International Business Machines Corporation, Armonk, NY (US)

(72) Inventors: Nadiya Kochura, Bolton, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 16/209,816

(22) Filed: Dec. 4, 2018

(65) Prior Publication Data

US 2020/0175430 A1 Jun. 4, 2020

(51) Int. Cl.
*G06Q 10/02* (2012.01)
*G06F 3/04842* (2022.01)
*H04L 51/02* (2022.01)

(52) U.S. Cl.
CPC ........ *G06Q 10/02* (2013.01); *G06F 3/04842* (2013.01); *H04L 51/02* (2013.01)

(58) Field of Classification Search
CPC . G06F 9/00; G06F 11/00; H04L 41/00; H04L 51/02; G06Q 30/00; G06Q 10/00; G06Q 10/02
USPC .......................................................... 705/5
See application file for complete search history.

(56) References Cited

U.S. PATENT DOCUMENTS

| 6,418,440 B1* | 7/2002 | Kuo | G06F 16/3329 |
| 7,685,273 B1* | 3/2010 | Anastas | H04L 12/6418 709/224 |
| 8,630,961 B2* | 1/2014 | Beilby | G06N 3/004 706/11 |
| 8,930,296 B2* | 1/2015 | McBride | G06N 5/025 706/47 |
| 9,369,410 B2* | 6/2016 | Capper | H04L 51/02 |
| 9,372,858 B1* | 6/2016 | Vagell | G06F 40/166 |
| 2003/0144922 A1* | 7/2003 | Schrantz | G06Q 30/08 705/26.1 |

(Continued)

FOREIGN PATENT DOCUMENTS

| EP | 1061459 A2 | 12/2000 | |
| EP | 2698955 A1 * | 2/2014 | ............. H04L 51/32 |

OTHER PUBLICATIONS

David Marcus' Keynote @ Facebook F8 16' https://www.youtube.com/watch?v=9JbmAw1E-Wg&t=424s (Year: 2016).*

(Continued)

*Primary Examiner* — Omar Zeroual
*Assistant Examiner* — Duane N. Moore
(74) *Attorney, Agent, or Firm* — Edward J. Wixted, III

(57) ABSTRACT

A method includes generating, at a controller, a snapshot of content displayed at a user interface screen. The content associated with a domain for a particular service. The method also includes performing user interface element recognition on the snapshot to identify a user interface element in the content. The method further includes associating the user interface element with a user interface element intent and associating the user interface element intent with a particular phrase based on the domain. The method also includes generating an automated interactive support prompt based on the particular phrase to be output for user interaction. The user interaction is usable for performance of the particular service.

18 Claims, 8 Drawing Sheets

(56) References Cited

U.S. PATENT DOCUMENTS

| | | | | |
|---|---|---|---|---|
| 2007/0192186 | A1* | 8/2007 | Greene | G06Q 30/02 |
| | | | | 705/14.27 |
| 2008/0294619 | A1* | 11/2008 | Hamilton, II | G06F 16/3326 |
| | | | | 707/999.005 |
| 2013/0174034 | A1* | 7/2013 | Brown | G06Q 10/10 |
| | | | | 715/708 |
| 2013/0179209 | A1* | 7/2013 | Milosevich | G06Q 10/06 |
| | | | | 705/7.18 |
| 2014/0155022 | A1* | 6/2014 | Kandregula | G06Q 50/01 |
| | | | | 455/405 |
| 2014/0181705 | A1* | 6/2014 | Hey | G06F 11/3672 |
| | | | | 715/764 |
| 2016/0179323 | A1* | 6/2016 | Kashi | G06F 16/29 |
| | | | | 715/708 |
| 2017/0116982 | A1* | 4/2017 | Gelfenbeyn | G10L 15/1815 |
| 2017/0230312 | A1* | 8/2017 | Barrett | H04L 51/046 |
| 2017/0243107 | A1* | 8/2017 | Jolley | G06F 16/951 |
| 2017/0277625 | A1* | 9/2017 | Shtuchkin | G06F 11/3688 |
| 2017/0310613 | A1* | 10/2017 | Lalji | H04L 51/02 |
| 2017/0329922 | A1* | 11/2017 | Eberting | G16H 40/67 |
| 2019/0251165 | A1* | 8/2019 | Bachrach | G06N 3/084 |

OTHER PUBLICATIONS

Expedia bot for Facebook Messenger https://www.youtube.com/watch?v=ZFo6Sdlh7mc (Year: 2016).*

* cited by examiner

AUTOMATED INTERACTIVE SUPPORT

BACKGROUND

The present disclosure relates to user interfaces, and more specifically, to automated interactive support.

SUMMARY

According to one implementation of the present disclosure, a method includes generating, at a controller, a snapshot of content displayed at a user interface screen. The content associated with a domain for a particular service. The method also includes performing user interface element recognition on the snapshot to identify a user interface element in the content. The method further includes associating the user interface element with a user interface element intent and associating the user interface element intent with a particular phrase based on the domain. The method also includes generating an automated interactive support prompt based on the particular phrase to be output for user interaction. The user interaction is usable for performance of the particular service.

According to another implementation of the present disclosure, an apparatus includes a memory and a user interface screen that is configured to display content associated with a domain for a particular service. The apparatus also includes a controller coupled to the memory and to the user interface screen. The controller is configured to generate a snapshot of the content displayed at the user interface screen. The controller is also configured to perform user interface element recognition on the snapshot to identify a user interface element in the content. The controller is further configured to associate the user interface element with a user interface element intent and to associate the user interface element intent with a particular phrase based on the domain. The controller is also configured to generate an automated interactive support prompt based on the particular phrase and to display the automated interactive support prompt at the user interface screen for user interaction. The user interaction is usable for performance of the particular service.

According to another implementation of the present disclosure, a computer program product for generating an automated interactive support service includes a computer readable storage medium having program instructions embodied therewith. The program instructions are executable by a controller to cause the controller to generate, by the controller, a snapshot of content displayed at a user interface screen. The content is associated with a domain for a particular service. The program instructions are also executable by the controller to cause the controller to perform, by the controller, user interface element recognition on the snapshot to identify a user interface element in the content. The program instructions are also executable by the controller to cause the controller to associate, by the controller, the user interface element with a user interface element intent. The program instructions are also executable by the controller to cause the controller to associate, by the controller, the user interface element intent with a particular phrase based on the domain. The program instructions are also executable by the controller to cause the controller to generate, by the controller, an automated interactive support prompt based on the particular phrase. The program instructions are also executable by the controller to cause the controller to display, by the controller, the automated interactive support prompt at the user interface screen for user interaction. The user interaction is usable for performance of the particular service.

DETAILED DESCRIPTION

Figure 1:
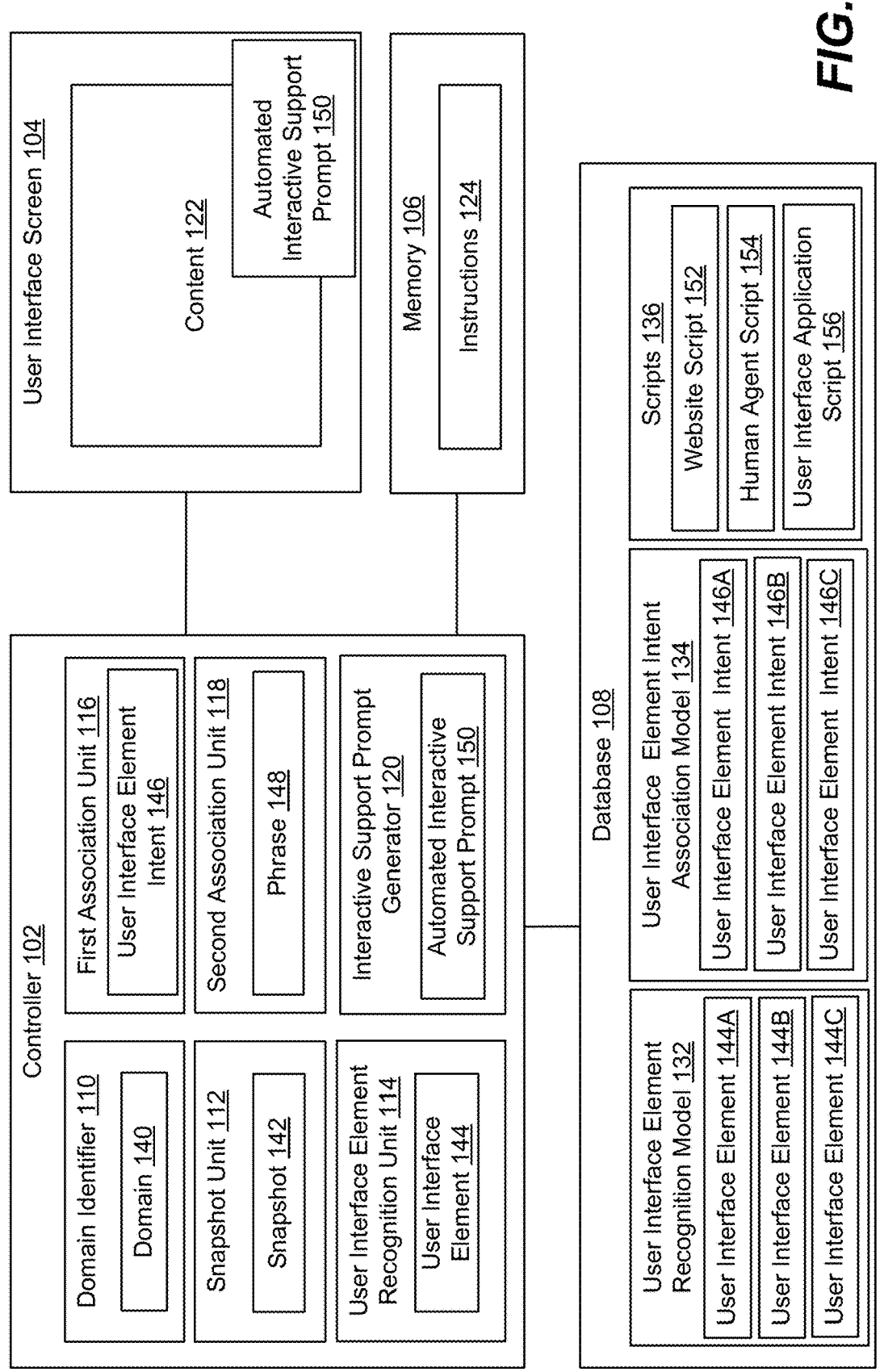
FIG. 1 is a diagram of a system that is operable to generate an automated interactive support service.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple user interface elements are illustrated and associated with reference numbers 144A, 144B, etc. When referring to a particular one of these user interface elements, such as the user interface element 144A, the distinguishing letter "A" is used. However, when referring to any arbitrary one of these user interface elements 144 or to these user interface elements as a group, the reference number 144 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Websites generally include multiple prompts that a user selects from in order for perform a service. As a non-limiting example, a flight-booking website may include a prompt that requires the user to select a departing date and a returning date. The prompt can be in the form of a calendar. Additionally, the flight-booking website may include a prompt that requires the user to select a departing city and a destination city. The user may have to select from pre-defined abbreviations for cities. If the user is unfamiliar with the abbreviations, the user may struggle selecting the departing city and the destination city. For example, the user may be used to calling into an airline service to book a flight over the phone. Booking flights over the phone enables the user to speak in their natural language and have natural conversation with a live operator. However, navigating a website requires the user to follow prompts, which may be difficult for some users who are not technology savvy.

One advantage of one or more techniques described herein is generation of an automated interactive support prompt for a service based on user interface analysis. For example, user interface elements are recognized and used to generate conversational scripts associated with the service. User interaction and feedback to the conversational scripts are obtained to identify attributes for a desired service. Based on the attributes, the service is performed without a user having to navigate through a website. For example, the user can use natural language in conjunction with questions and inquiries from the conversational scripts to provide the attributes for the desired service. Additionally, the features, functions, and advantages that have been described can be achieved independently in various implementations or may be combined in yet other implementations, further details of which are disclosed with reference to the following description and drawings.

FIG. 1 is a diagram of a system 100 that is operable to generate an automated interactive support service. The system 100 includes a controller 102, a user interface screen 104, a memory 106, and a database 108. The user interface screen 104 is coupled to the controller 102, and the controller 102 can control a display of the user interface screen 104. As a non-limiting example, the controller 102 can be integrated into a central processing unit that outputs data displayed on the user interface screen 104. The memory 106 is coupled to the controller 102, and the database 108 is coupled to the controller 102. The memory 106 is a non-transitory computer-readable storage device that includes instructions 124. The instructions 124 are executable by the controller 102 to perform operations described herein.

The controller 102 includes a domain identifier 110, a snapshot unit 112, a user interface element recognition unit 114, a first association unit 116, a second association unit 118, and an interactive support prompt generator 120. As described below, the controller 102 is configured to generate an automated interactive support prompt 150 that is displayed at the user interface screen 104. The automated interactive support prompt 150 is usable to perform a particular service. For example, content 122 associated with a domain 140 for the particular service is displayed at the user interface screen 104. As a non-limiting example, the particular service can include booking a flight, and the content 122 can include a website having a domain 140 dedicated to booking flights. As another non-limiting example, the particular service can include booking a hotel, and the content 122 can include a website having a domain 140 dedicated to booking hotels. As yet another non-limiting example, the particular service can include booking a rental car, and the content 122 can include a website having a domain 140 dedicated to booking rental cars. As yet another non-limiting example, the particular service can include an electronic commerce service. To illustrate, the particular service can include a service for making an order. For each service, the automated interactive support prompt 150 can interactively converse with a user to perform the service.

To illustrate, the domain identifier 110 is configured to determine the domain 140 associated with the content 122 displayed at the user interface screen 104. For example, the domain identifier 110 can identify a universal resource locator (URL) associated with the content 122. Based on the URL, the domain identifier 110 can determine the domain 140. The snapshot unit 112 is configured to generate a snapshot 142 of the content 122 displayed at the user interface screen 104. For example, the snapshot unit 112 can perform a screenshot operation to capture the snapshot 142 of the content 122 displayed at the user interface screen 104.

In an alternate implementation, the snapshot unit 112 can retrieve historical images of the content 122 based on the URL. For example, the snapshot unit 112 can access a database of web site designs based on the URL to retrieve a historical image of the content 122. In yet another alternate implementation, "snapshots" may be determined based on web page source code and/or scripts.

The user interface element recognition unit 114 is configured to perform user interface element recognition on the snapshot 142 to identify a user interface element 144 in the content 122. Non-limiting examples of the user interface element 144 can include a calendar image from the snapshot 142, one or more radio buttons from the snapshot 142, etc. To perform the user interface element recognition, the user interface element recognition unit 114 accesses a user interface element recognition model 132 in the database 108. The user interface element recognition model 132 is trained to recognize user interface elements 144A-144C based on image data. To illustrate, the user interface element recognition model 132 can recognize whether a user interface element 144A is in the snapshot 142 of the content 122, whether a user interface element 144B is in the snapshot 142 of the content 122, whether a user interface element 144C is in the snapshot 142 of the content 122, etc. According to another implementation, the user interface element recognition unit 114 accesses a lookup table to identify the user interface element 144 in the content 122. For example, a portion of the snapshot can be provided to the lookup table to identify the user interface element 144.

According to one implementation, the user interface element 144A corresponds to a calendar image, the user interface element 144B corresponds to a radio button, and the user interface element 144C corresponds to a text entry prompt. The user interface element recognition unit 114 inputs the snapshot 142 into the user interface element recognition model 132 to identify the user interface element 144. For example, the user interface element recognition unit 114 accesses (e.g., downloads, installs, retrieves, executes, etc.) the user interface element recognition model 132 and provides the snapshot 142 of the content 122 to the user interface element recognition model 132. Based on the snapshot 142, the user interface element recognition model 132 determines the user interface element 144 present in the content 122. The user interface element 144 can include one or more of the user interface elements 144A-144C in the user interface element recognition model 132. For ease of description with respect to FIG. 1, it will be assumed that the user interface element 144 is a calendar image.

The first association unit 116 is configured to associate the user interface element 144 with a user interface element intent 146. For example, the first association unit 116 links the user interface element 144 with the user interface element intent 146. Non-limiting examples of the user interface element intent 146 can include date selection, a single selection from pre-defined options, etc. To associate the user interface element 144 with the user interface element intent 146, the first association unit 116 accesses a user interface element intent association model 134 in the database 108. The user interface element intent association model 134 is trained to recognize user interface element intents 146A-146C based on the user interface element 144. To illustrate, the user interface element intent association model 134 can recognize whether a user interface element intent 146A is associated with the user interface element 144, whether a user interface element intent 146B is associated with the user interface element 144, whether a user interface element intent 146C is associated with the user interface element 144, etc. According to another implementation, the first association unit accesses a lookup table to link data associated with the user interface element 144 to the user interface element intent 146. For example, data associated with the user interface element 144 is provided to the lookup table to identify the user interface element intent 146.

According to one implementation, the user interface element intent 146A corresponds to date selection, the user interface element intent 146B corresponds to a single selection from pre-defined options, and the user interface element intent 146C corresponds to a text entry. The first association unit 116 inputs the user interface element 144 into the user interface element intent association model 134 to identify the user interface element intent 146. For example, the first association unit 116 accesses (e.g., downloads, installs, retrieves, executes, etc.) the user interface element intent association model 134 and provides the user interface element 144 to the user interface element intent association model 134. Based on the user interface element 144, the user interface element intent association model 134 determines the user interface element intent 146. The user interface element intent 146 can include one or more of the user interface element intents 146A-146C in the user interface element intent association model 134. Because the user interface element 144 described with respect to FIG. 1 is a calendar image (for ease of description), it will be assumed that the user interface element intent 146 is date selection.

The second association unit 118 is configured to associate the user interface element intent 146 with a phrase 148 based on the domain 140. For example, the second association unit 118 parses through a plurality of scripts 136 in the database 108 to generate a plurality of phrases. The plurality of scripts 136 can include a website script 152, a human agent script 154, or a user interface application script 156. The website script 152 corresponds to a script of a website associated with the domain 140 or a script of a website with a similar domain. For example, hotel-booking websites may have similar scripts that are used to facilitate booking hotel reservations. The human agent script 154 corresponds to a textual script that may be read aloud by a human agent in a call center (e.g., a call center script) that is used to facilitate booking various reservations. The user interface application script 156 corresponds to a script used by an application to facilitate booking various reservations. According to another implementation, the second association unit 118 accesses a lookup table to determine the phrase 148. For example, data associated with the domain 140 is provided to the lookup table to identify the phrase 148.

The second association unit 118 selects a sample phrase from the plurality of phrases based on the user interface element intent 146. As described above, the user interface element intent 146 is date selection. Thus, a non-limiting example of a sample phrase can be "What dates would you like to . . . ?" The second association unit 118 modifies the sample phrase based on data associated with the domain 140 to generate the phrase 148. As a non-limiting example, if the data associated with the domain 140 indicates that the domain 140 is used for hotel bookings, the second association unit 118 can modify the sample phrase such that the phrase 148 is "What dates would you like to stay at your hotel?" As another non-limiting example, if the data associated with the domain 140 indicates that the domain 140 is used for rental car bookings, the second association unit 118 can modify the sample phrase such that the phrase 148 is "What dates would you like to rent your car?" As yet another non-limiting example, if the data associated with the domain 140 indicates that the domain 140 is used for flight bookings, the second association unit 118 can modify the sample phrase such that the phrase 148 is "What dates you like to depart and return?"

The interactive support prompt generator 120 is configured to generate the automated interactive support prompt 150 based on the phrase 148. The controller 102 is configured to display the automated interactive support prompt 150 at the user interface screen 104 for user interaction. For example, the automated interactive support prompt 150 can include the phrase 148 and a mechanism for a user to respond to the phrase 148. The controller 102 uses the response (e.g., the user interaction) to perform the particular service associated with the domain 140. For example, the controller 102 uses the response to interact with the website to book the hotel, book the flight, book the rental car, etc. According to one implementation, the controller 102 generates a virtual chat-bot and displays the automated interactive support prompt 150 at the user interface screen via the virtual chat-bot. According to another implementation, the automated interactive support prompt 150 is an audio prompt that is output to a user via a speaker (not shown). In this scenario, a microphone (not shown) captures a verbal response to the automated interactive support prompt 150, and the controller 102 uses the verbal response to perform the service associated with the domain 140. As described with respect to FIGS. 3-4, the controller 102 can generate additional automated interactive support prompts in response to receiving the user interaction.

The system 100 of FIG. 1 enables generation of the automated interactive support prompt 150 for user interface services that otherwise do not utilize automated interactive support service (e.g., legacy user interface services). For example, the controller 102 can generate a virtual chat-bot (e.g., the automated interactive support prompt 150) that provides a conversational script to support user interaction. Based on the user interaction, the controller 102 can navigate the legacy user interface services to perform different tasks, such as booking a hotel room, booking a rental car, booking a flight, ordering food, ordering consumer goods, etc. For example, the automated interactive support prompt 150 acquires different attributes (e.g., dates, locations, etc.) to fulfill a service request associated with a legacy user interface service. After the attributes are obtained, the controller 102 provides the attributes to the legacy user interface service to enable the different tasks to be performed. Thus, because the controller 102 generates the automated interactive support prompt 150 that uses a conversational script, the user can interact with the automated interactive support prompt 150 using natural language to perform tasks as opposed to navigating a web site.

Figure 2:
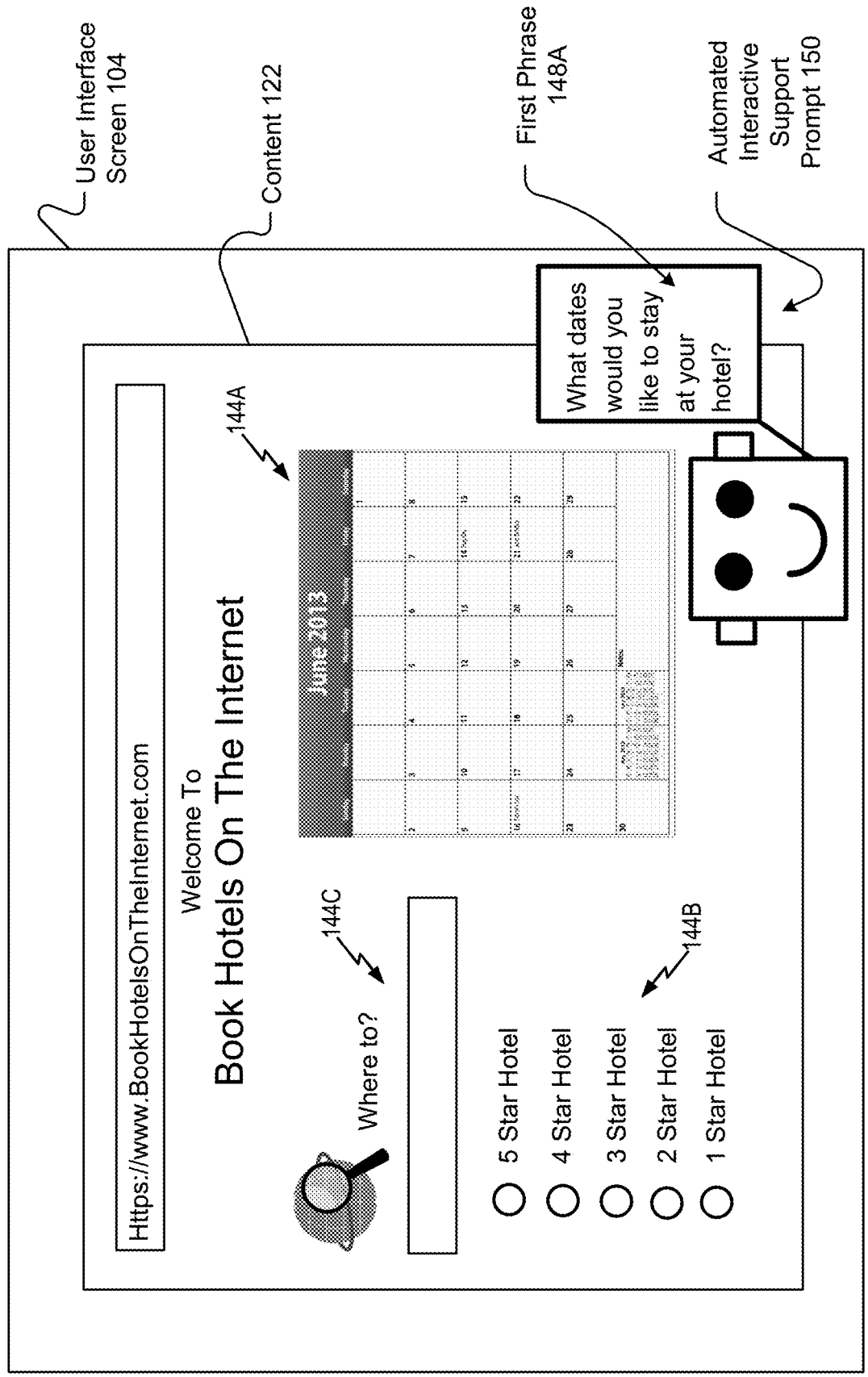
FIG. 2 is an illustrative example of displaying an automated interactive support prompt at a user interface screen.

FIG. 2 is an illustrative example of displaying an automated interactive support prompt at a user interface screen. In FIG. 2, the user interface screen 104 displays the content 122 described with respect to FIG. 1. For example, the user interface screen 104 displays a website named "Book Hotels On The Internet." The domain 140 for the website is "booking hotels" which may be derived from the URL for the website "BookHotelsOnTheInternet.com". It should be understood that the domain 140 and the content 122 displayed in FIG. 2 is merely a non-limiting example of content and is for illustrative purposes only.

The content 122 includes a search bar towards the top that includes a website address of the website. For example, the website address is "Https://www.BookHotelsOnTheInternet.com". The content 122 also includes the user interface element 144A, the user interface element 144B, and the user interface element 144C. For example, the user interface element 144A is a calendar image, the user interface element 144B includes one or more radio buttons, and the user interface element 144C includes a text entry prompt. As described below, the components of the controller 102 perform the operations described with respect to FIG. 1 to generate the automated interactive support prompt 150 that displays a first phrase 148A at the user interface screen 104.

The domain identifier 110 determines the domain 140 associated with the content 122 displayed at the user interface screen 104. For example, the domain identifier 110 identifies the URL (e.g., "Https://www.BookHotelsOnTheInternet.com") associated with the domain 140. Based on the URL and the content 122 (e.g., text and metadata of the website), the domain identifier 110 can determine the domain 140. The snapshot unit 112 generates the snapshot 142 of the content 122 displayed at the user interface screen 104. For example, the snapshot unit 112 performs a screenshot operation to capture the snapshot 142 of the content 122 displayed at the user interface screen 104.

The user interface element recognition unit 114 performs user interface element recognition on the snapshot 142 to identify the user interface element 144A (e.g., the calendar image) in the content 122. To perform the user interface element recognition, the user interface element recognition unit 114 accesses the user interface element recognition model 132 in the database 108. The user interface element recognition model 132 is trained to recognize the user interface element 144A based on image data (e.g. the snapshot 142). For example, the user interface element recognition unit 114 inputs the snapshot 142 into the user interface element recognition model 132 to identify the user interface element 144A.

The first association unit 116 associates the user interface element 144A with the user interface element intent 146A (e.g., date selection). For example, the first association unit 116 links the user interface element 144A with the user interface element intent 146A. To associate the user interface element 144A with the user interface element intent 146A, the first association unit 116 accesses the user interface element intent association model 134 in the database 108. The user interface element intent association model 134 is trained to recognize user interface element intent 146A based on the user interface element 144A. The first association unit 116 inputs the user interface element 144A into the user interface element intent association model 134 to identify the user interface element intent 146A. Because the user interface element 144A is the calendar image, the user interface element intent 146A is date selection.

The second association unit 118 associates the user interface element intent 146A with a first phrase 148A based on the domain 140. For example, the second association unit 118 parses through the plurality of scripts 136 to select a sample phrase from the plurality of phrases based on the user interface element intent 146A. As described above, the user interface element intent 146A is date selection. Thus, in FIG. 2, the sample phrase is "What dates would you like to . . . ?" The second association unit 118 modifies the sample phrase based on data associated with the domain 140 to generate the first phrase 148A. Because the data associated with the domain 140 indicates that the domain 140 is used for hotel bookings, the second association unit 118 modifies the sample phrase such that the first phrase 148A is "What dates would you like to stay at your hotel?"

The interactive support prompt generator 120 generates the automated interactive support prompt 150 (e.g., the virtual chat-bot) based on the first phrase 148A and displays the automated interactive support prompt 150 at the user interface screen 104 for user interaction. The controller 102 uses the response (e.g., the user interaction) to perform the particular service (e.g., hotel booking) associated with the domain 140. For example, the controller 102 uses the response (e.g., the dates provided by a user) to interact with the website to book the hotel. In response to receiving the user interaction and using the user interaction to advance performance of the particular service, another automated interactive support prompt is generated to further advance performance of the particular service, as described in FIG. 3.

Figure 3:
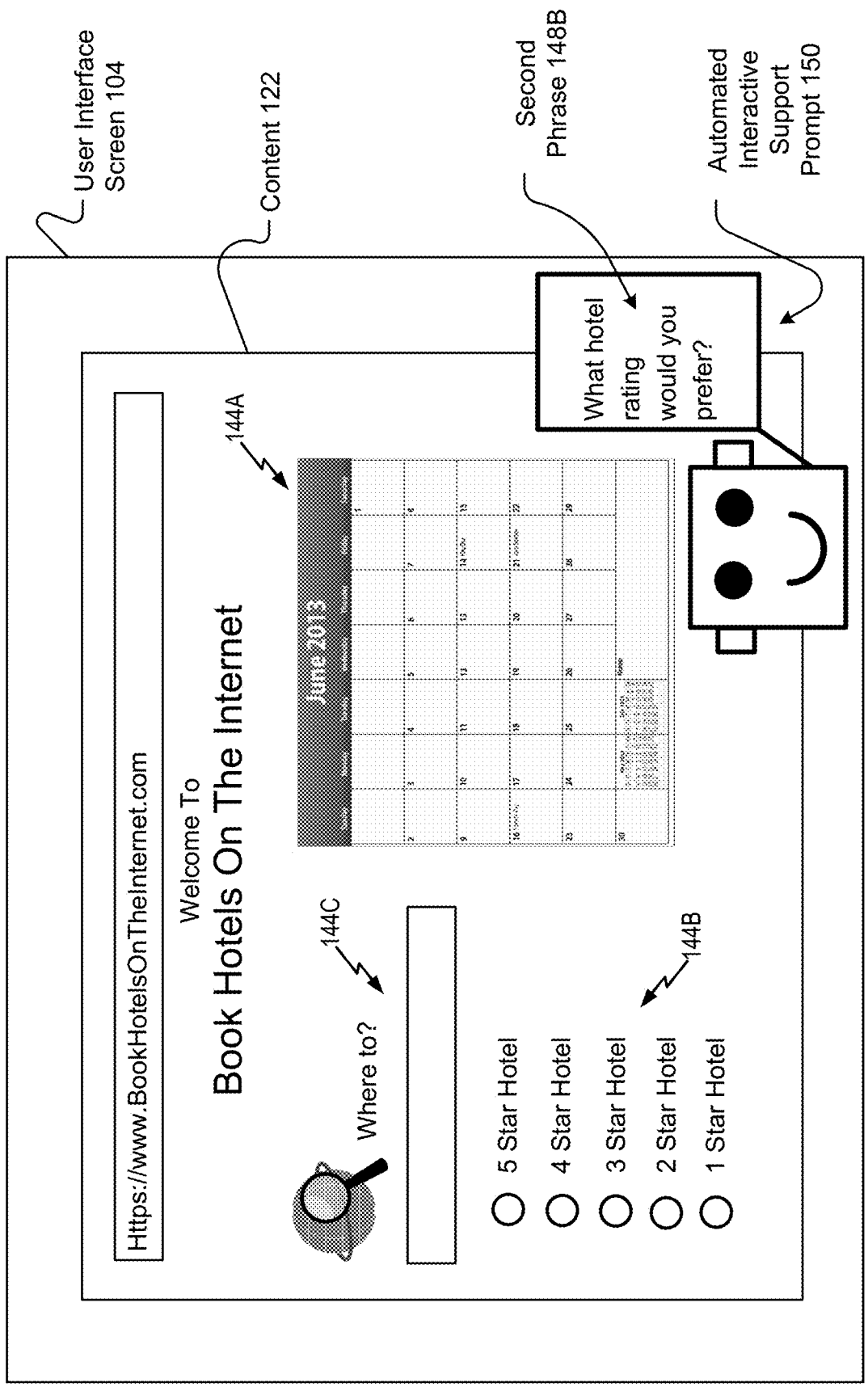
FIG. 3 is another illustrative example of displaying an automated interactive support prompt at a user interface screen.

FIG. 3 is another illustrative example of displaying an automated interactive support prompt at a user interface screen. In FIG. 3, the user interface screen 104 displays the content 122 described with respect to FIGS. 1-2. The content 122 includes the user interface element 144A, the user interface element 144B, and the user interface element 144C. Although not shown in FIG. 3, it is to be understood that in some examples the user interface screen may dynamically update based on an interaction with previous chat-bot question. For example, the user interface screen in FIG. 3 may have dates entered by the user in response to the first phrase 148A of FIG. 2 highlighted or otherwise selected at the user interface element 144A (i.e., the calendar).

The user interface element recognition unit 114 performs user interface element recognition on the snapshot 142 of the content 122 to identify the user interface element 144B (e.g., the radio buttons) in the content 122. To perform the user interface element recognition, the user interface element recognition unit 114 accesses the user interface element recognition model 132 in the database 108. The user interface element recognition model 132 is trained to recognize the user interface element 144A based on image data (e.g. the snapshot 142). For example, the user interface element recognition unit 114 inputs the snapshot 142 into the user interface element recognition model 132 to identify the user interface element 144B.

The first association unit 116 associates the user interface element 144B with the user interface element intent 146B. The user interface element intent 146B includes a single selection of pre-defined objects. For example, the user interface element intent 146B is to make a single selection from a one-star hotel, a two-star hotel, a three-star hotel, a four-star hotel, or a five-star hotel. To associate the user interface element 144B with the user interface element intent 146B, the first association unit 116 accesses the user interface element intent association model 134 in the database 108. The user interface element intent association model 134 is trained to recognize user interface element intent 146B (e.g., a single selection from pre-defined objects) based on the user interface element 144B (e.g., the radio buttons). The first association unit 116 inputs the user interface element 144B into the user interface element intent association model 134 to identify the user interface element intent 146B. Because the user interface element 144B includes the radio buttons, the user interface element intent 146B is a single selection from pre-defined objects.

The second association unit 118 associates the user interface element intent 146B with a second phrase 148B based on the domain 140 and the text proximate to the user interface element 144B. For example, the second association unit 118 parses through the plurality of scripts 136 to select a sample phrase from the plurality of phrases based on the user interface element intent 146B. As described above, the user interface element intent 146B is a single selection from pre-defined objects. Thus, in FIG. 3, the sample phrase is "What . . . would you prefer?" The second association unit 118 modifies the sample phrase based on data associated with the domain 140 and the text proximate to the user interface element 144B to generate the second phrase 148B. Because the data associated with the domain 140 indicates that the domain 140 is used for hotel bookings, the second association unit 118 modifies the sample phrase such that the second phrase 148B is "What hotel rating would you prefer?"

The interactive support prompt generator 120 generates the automated interactive support prompt 150 (e.g., the virtual chat-bot) based on the second phrase 148B and displays the automated interactive support prompt 150 at the user interface screen 104 for user interaction. The controller 102 uses the response (e.g., the user interaction) to perform the particular service (e.g., hotel booking) associated with the domain 140. For example, the controller 102 uses the response (e.g., the hotel rating selected by a user) to interact with the website to book the hotel. In response to receiving the user interaction and using the user interaction to advance performance of the particular service, another automated interactive support prompt is generated to further advance performance of the particular service, as described in FIG. 4.

Figure 4:
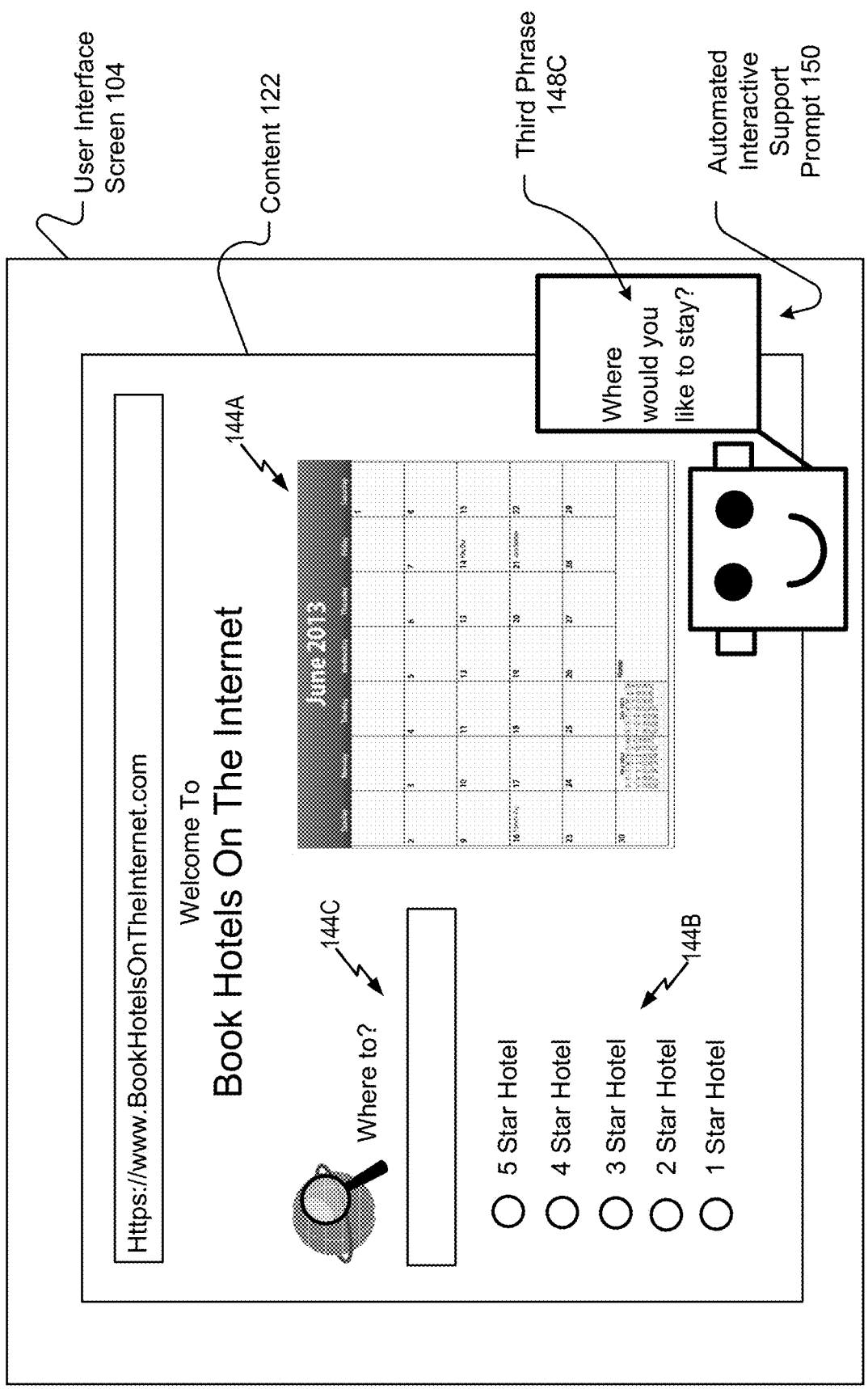
FIG. 4 is another illustrative example of displaying an automated interactive support prompt at a user interface screen.

FIG. 4 is another illustrative example of displaying an automated interactive support prompt at a user interface screen. In FIG. 4, the user interface screen 104 displays the content 122 described with respect to FIGS. 1-3. The content 122 includes the user interface element 144A, the user interface element 144B, and the user interface element 144C. Although not shown in FIG. 4, it is to be understood that in some examples the user interface screen may dynamically update based on an interaction with previous chat-bot question. For example, the user interface screen in FIG. 4 may have dates entered by the user in response to the first phrase 148A of FIG. 2 highlighted or otherwise selected at the user interface element 144A (i.e., the calendar). As another example, the user interface screen in FIG. 4 may have the hotel star rating entered by the user in response to the second phrase 148B of FIG. 3 selected at the user interface element 144B (i.e., the list of radio buttons).

The user interface element recognition unit 114 performs user interface element recognition on the snapshot 142 of the content 122 to identify the user interface element 144C (e.g., the text entry prompt) in the content 122. To perform the user interface element recognition, the user interface element recognition unit 114 accesses the user interface element recognition model 132 in the database 108. The user interface element recognition model 132 is trained to recognize the user interface element 144C based on image data (e.g. the snapshot 142). For example, the user interface element recognition unit 114 inputs the snapshot 142 into the user interface element recognition model 132 to identify the user interface element 144C.

The first association unit 116 associates the user interface element 144C with the user interface element intent 146C. The user interface element intent 146C includes non-specific user input. For example, the user interface element intent 146C is to allow the user to input random words or expressions. To associate the user interface element 144C with the user interface element intent 146C, the first association unit 116 accesses the user interface element intent association model 134 in the database 108. The user interface element intent association model 134 is trained to recognize user interface element intent 146C (e.g., a non-specific user input) based on the user interface element 144C (e.g., the text entry prompt). The first association unit 116 inputs the user interface element 144C into the user interface element intent association model 134 to identify the user interface element intent 146C. Because the user interface element 144C includes the text entry prompt, the user interface element intent 146C is entry of random words or expressions.

The second association unit 118 associates the user interface element intent 146C with a third phrase 148C based on the domain 140 and the text proximate to the user interface element 144C. For example, the second association unit 118 parses through the plurality of scripts 136 to select a sample phrase from the plurality of phrases based on the user interface element intent 146C. As described above, the user interface element intent 146C is entry of random words or expressions. Thus, in FIG. 4, the sample phrase may be empty. The second association unit 118 modifies the sample phrase based on data associated with the domain 140 and the text proximate to the user interface element 144C to generate the third phrase 148C. Because the data associated with the domain 140 indicates that the domain 140 is used for hotel bookings and the text proximate to the user interface element 144C states "Where to?", the second association unit 118 modifies the sample phrase such that the third phrase 148C is "Where would you like to stay?"

The interactive support prompt generator 120 generates the automated interactive support prompt 150 (e.g., the virtual chat-bot) based on the third phrase 148C and displays the automated interactive support prompt 150 at the user interface screen 104 for user interaction. The controller 102 uses the response (e.g., the user interaction) to perform the particular service (e.g., hotel booking) associated with the domain 140. For example, the controller 102 uses the response (e.g., the location provided by a user) to interact with the web site to book the hotel. Other phrases can be generated according to similar techniques if other user interface elements 144 are recognized. Additionally, follow-up phrases (or questions) can be generated based on the scripts 136 to enhance the user feedback. For example, the follow-up phrases can include "What neighborhood would you like to stay?", "What amenities would you like for your room to have?", etc. The additional phrases (or questions) are displayed by interactive support prompt 150 to collect additional information to perform the hotel bookings. The service (e.g., booking of the hotel) can be performed using information provided through the automated interactive support prompt 150. Similar operations, as described with respect to FIGS. 2-4, can be performed for different services, such a flight booking, rental car booking, etc.

The techniques described with respect to FIGS. 2-4 enable generation of the automated interactive support prompt 150 for user interface services that otherwise do not utilize automated interactive support service (e.g., legacy user interface services). For example, the controller 102 can generate a virtual chat-bot (e.g., the automated interactive support prompt 150) that provides a conversational script to support user interaction. Based on the user interaction, the controller 102 can navigate the legacy user interface services to book a hotel room. For example, the automated interactive support prompt 150 acquires different attributes (e.g., dates, locations, hotel ratings, etc.) to fulfill a service request associated with a legacy user interface service. After the attributes are obtained, the controller 102 provides the attributes to the legacy user interface service to enable the different tasks to be performed. Thus, because the controller 102 generates the automated interactive support prompt 150 that uses a conversational script, the user can interact with the automated interactive support prompt 150 using natural language to perform tasks as opposed to navigating a website.

Figure 5:
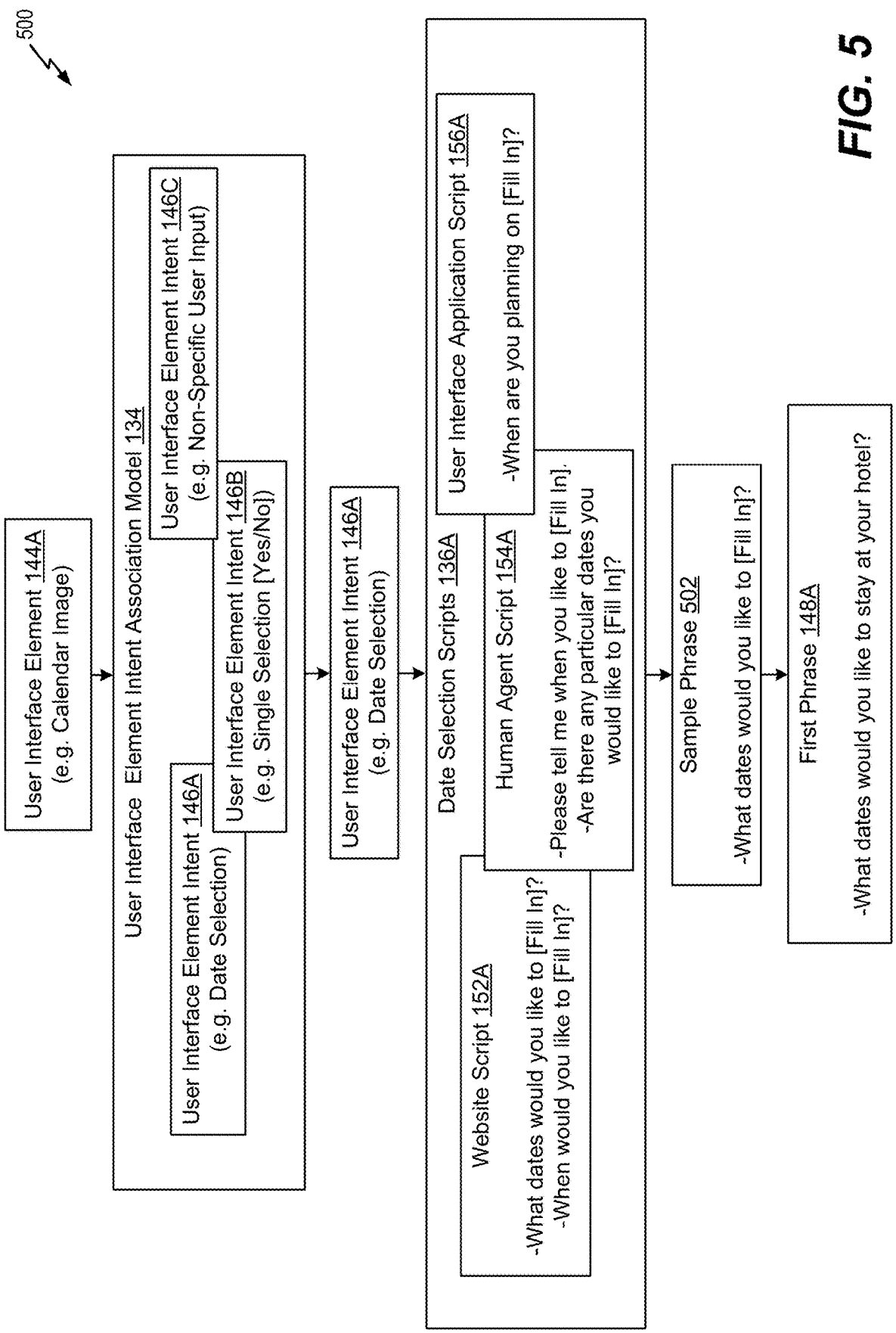
FIG. 5 is a flowchart of a process for generating a phrase for an automated interactive support prompt based on user interface analysis.

FIG. 5 is a flowchart of a process 500 for generating a phrase for an automated interactive support prompt based on user interface analysis. The operations associated with the process 500 can be performed by the controller 102.

As described with respect to FIGS. 1-2, the user interface element recognition unit 144 performs user interface element recognition on the snapshot 142 to identify the user interface element 144A (e.g., the calendar image) in the content 122. According to the process 500, the user interface element 144A is provided to the user interface element intent association model 134. The user interface element intent association model 134 is trained to recognize user interface element intent 146A (e.g., date selection), the user interface element intent 146B (e.g., a single selection or a yes/no selection), the user interface element intent 146C (e.g., a non-specific user input or text entry), and other user interface element intents 146 based on a particular user interface element 144.

The first association unit 116 runs the user interface element intent association model 134 to associate the user interface element 144A with the user interface element intent 146A (e.g., date selection). For example, the first association unit 116 links the calendar image to date selection. According to the process 500, the user interface element intent 146A is provided to a plurality of date selection scripts 136A for processing. The plurality of date selection scripts 136A is a subset of the plurality of scripts 136. The second association unit 118 parses through the plurality of date selection scripts 136A to select a sample phrase from a plurality of phrases. The plurality of date selection scripts 136A includes a website script 152A, a human agent script 154A, and a user interface application script 156A. Each script 152A-156A includes one or more phrases associated with the user interface element intent 146A. For example, the website script 152A includes the phrases "What dates would you like to [Fill In]?" and "When would you like to [Fill In]?" The human agent script 154A includes the phrases "Please tell me when you like to [Fill In]" and "Are there any particular dates you would like to [Fill In]?" The user interface application script 156A includes the phrase "When are you planning on [Fill In]?"

According to the process, the second association unit 118 selects a sample phrase 502 that corresponds to the first phrase in the website script 152A. The second association unit 118 modifies the sample phrase 502 based on data associated with the content 122 to generate the first phrase 148A. Because the data associated with the content 122 indicates that the domain 140 is used for hotel bookings, the second association unit 118 modifies the sample phrase 502 such that the first phrase 148A is "What dates would you like to stay at your hotel?"

The process 500 enables generation of the automated interactive support prompt 150 for user interface services that otherwise do not utilize automated interactive support service (e.g., legacy user interface services). For example, the controller 102 can generate a virtual chat-bot (e.g., the automated interactive support prompt 150) that provides a conversational script to support user interaction. Based on the user interaction, the controller 102 can navigate the legacy user interface services to perform different tasks, such as booking a hotel room, a rental car, a flight, etc. For example, the automated interactive support prompt 150 acquires different attributes (e.g., dates, locations, etc.) to fulfill a service request associated with a legacy user interface service. After the attributes are obtained, the controller 102 provides the attributes to the legacy user interface service to enable the different tasks to be performed. Thus, because the controller 102 generates the automated interactive support prompt 150 that uses a conversational script, the user can interact with the automated interactive support prompt 150 using natural language to perform tasks as opposed to navigating a website.

Figure 6:
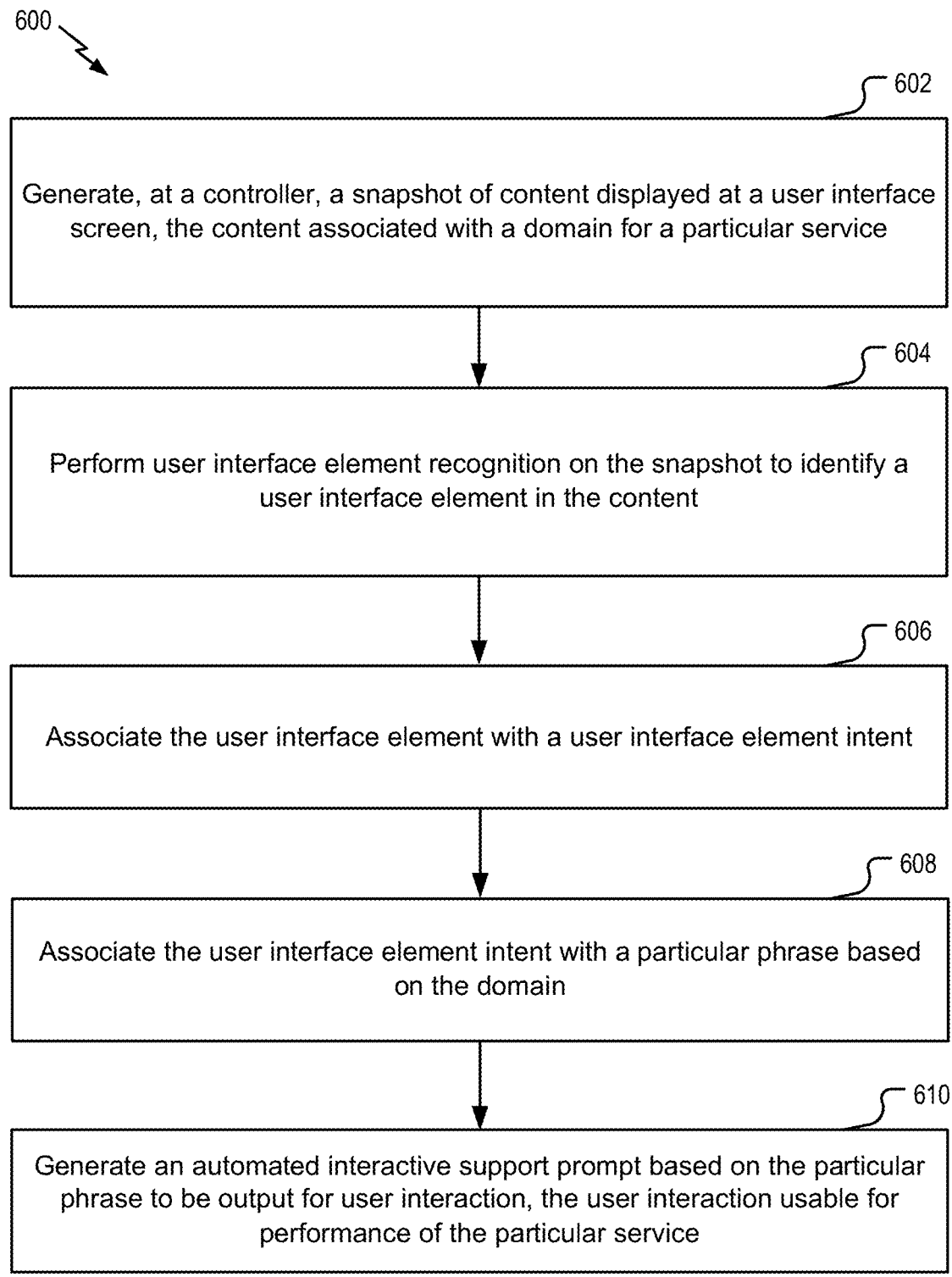
FIG. 6 is a flowchart of a method for generating an automated interactive support service.

FIG. 6 is a flowchart of a method 600 for generating an automated interactive support service. In an illustrative example, the method 600 is performed by the system 100.

The method 600 includes generating, at a controller, a snapshot of content displayed at a user interface screen, at 602. The content is associated with a domain for a particular service. For example, referring to FIG. 1, the snapshot unit 112 generates the snapshot 142 of the content 122 displayed at the user interface screen 104. To illustrate, the snapshot unit 112 performs a screenshot operation (e.g., a screen capture operation) to capture the snapshot 142 of the content 122 displayed at the user interface screen 104. The content 122 is associated with the domain 140 for a particular service. The particular service includes booking a flight, booking a hotel, booking a rental car, or another service.

The method 600 includes performing user interface element recognition on the snapshot to identify a user interface element in the content, at 604. For example, referring to FIG. 1, the user interface element recognition unit 114 performs user interface element recognition on the snapshot 142 to identify the user interface element 144 in the content 122. Performing the user interface element recognition includes accessing at least one user interface element recognition model 132 that is trained to recognize user interface elements 144A-144C. Performing the user interface element recognition also includes inputting the snapshot 142 into the at least one user interface element recognition model 132 to identify the user interface element 144.

The method 600 also includes associating the user interface element with a user interface element intent, at 606. For example, referring to FIG. 1, the first association unit 116 associates (e.g., links) the user interface element 144 with the user interface element intent 146. Associating the user interface element 144 with the user interface element intent 146 includes accessing at least one user interface element intent association model 134 that is trained to recognize user interface element intents 146A-146C. Associating the user interface element 144 with the user interface element intent 146 also includes inputting the user interface element 144 into the at least one user interface element intent association model 134 to identify the user interface element intent 146.

The method 600 also includes associating the user interface element intent with a particular phrase based on the domain, at 608. For example, referring to FIG. 1, the second association unit 118 associates the user interface element intent 146 with the phrase 148 based on the domain 140. Associating the user interface element intent 146 with the particular phrase (e.g., the phrase 148) includes parsing the plurality of scripts 136 to generate a plurality of phrases. The plurality of scripts 136 includes at least one of the website script 152, the human agent script 154, or the user interface application script 156. Associating the user interface element intent 146 with the particular phrase also includes selecting a sample phrase from the plurality of phrases based on the user interface element intent 146 and modifying the sample phrase based on data associated with the domain 140 to generate the particular phrase.

The method 600 also includes generating an automated interactive support prompt based on the particular phrase to be output for user interaction, at 610. The user interaction is usable for performance of the particular service. For example, referring to FIG. 1, the interactive support prompt generator 120 generates the automated interactive support prompt 150 based on the phrase 148, and the controller 102 displays the automated interactive support prompt 150 at the user interface screen 104 for user interaction. According to one implementation, the method 600 includes generating a virtual chat-bot and displaying the automated interactive support prompt 150 at the user interface screen 104 via the virtual chat-bot.

According to one implementation, the method 600 includes generating a second automated interactive support prompt in response to receiving the user interaction feedback and displaying the second automated interactive support prompt at the user interface screen to build a conversation. Generating the second automated interactive support prompt includes performing user interface element recognition on the snapshot to identify a second user interface element in the content and associating the second user interface element with a second user interface element intent. Generating the second automated interactive support prompt also includes associating the second user interface element intent with a second particular phrase based on the domain and generating the second automated interactive support prompt based on the second particular phrase.

The method 600 enables generation of the automated interactive support prompt 150 for user interface services that otherwise do not utilize automated interactive support service (e.g., legacy user interface services). For example, the controller 102 can generate a virtual chat-bot (e.g., the automated interactive support prompt 150) that provides a conversational script to support user interaction. Based on the user interaction, the controller 102 can navigate the legacy user interface services to perform different tasks, such as booking a hotel room, a rental car, a flight, etc. For example, the automated interactive support prompt 150 acquires different attributes (e.g., dates, locations, etc.) to fulfill a service request associated with a legacy user interface service. After the attributes are obtained, the controller 02 provides the attributes to the legacy user interface service to enable the different tasks to be performed. Thus, because the controller 102 generates the automated interactive support prompt 150 that uses a conversational script, the user can interact with the automated interactive support prompt 150 using natural language to perform tasks as opposed to navigating a website or another graphical user interface.

One or more aspects described herein can be implemented in a cloud computing environment. For example, one or more components described with reference to FIG. 1 can be implemented as a service that provides automated interactive support prompts, such as in automated generation of chat-bots for websites based on an analysis of GUI elements of the website. While chat-bot functionality is described herein with reference to automated interactive support prompts, it is to be understood that aspects of the present disclosure may apply to various artificially intelligent conversational agents that are generally programmed to conduct natural (human) language conversation. In selected non-limiting examples of the present disclosure, chat-bot functionality is described with reference to a travel booking web site.

Although this disclosure includes a detailed description on cloud computing, implementation of the teachings recited herein are not limited to a cloud computing environment. Rather, aspects of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In some implementations, this cloud model may include at least five characteristics, at least three service models, and at least four deployment models, as described herein.

Characteristics are as follows:

On-demand self-service: a cloud consumer can unilaterally provision computing capabilities, such as server time and network storage, as needed automatically without requiring human interaction with the service provider.

Broad network access: capabilities are available over a network and accessed through standard mechanisms that promote use by heterogeneous thin or thick client platforms (e. g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e. g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
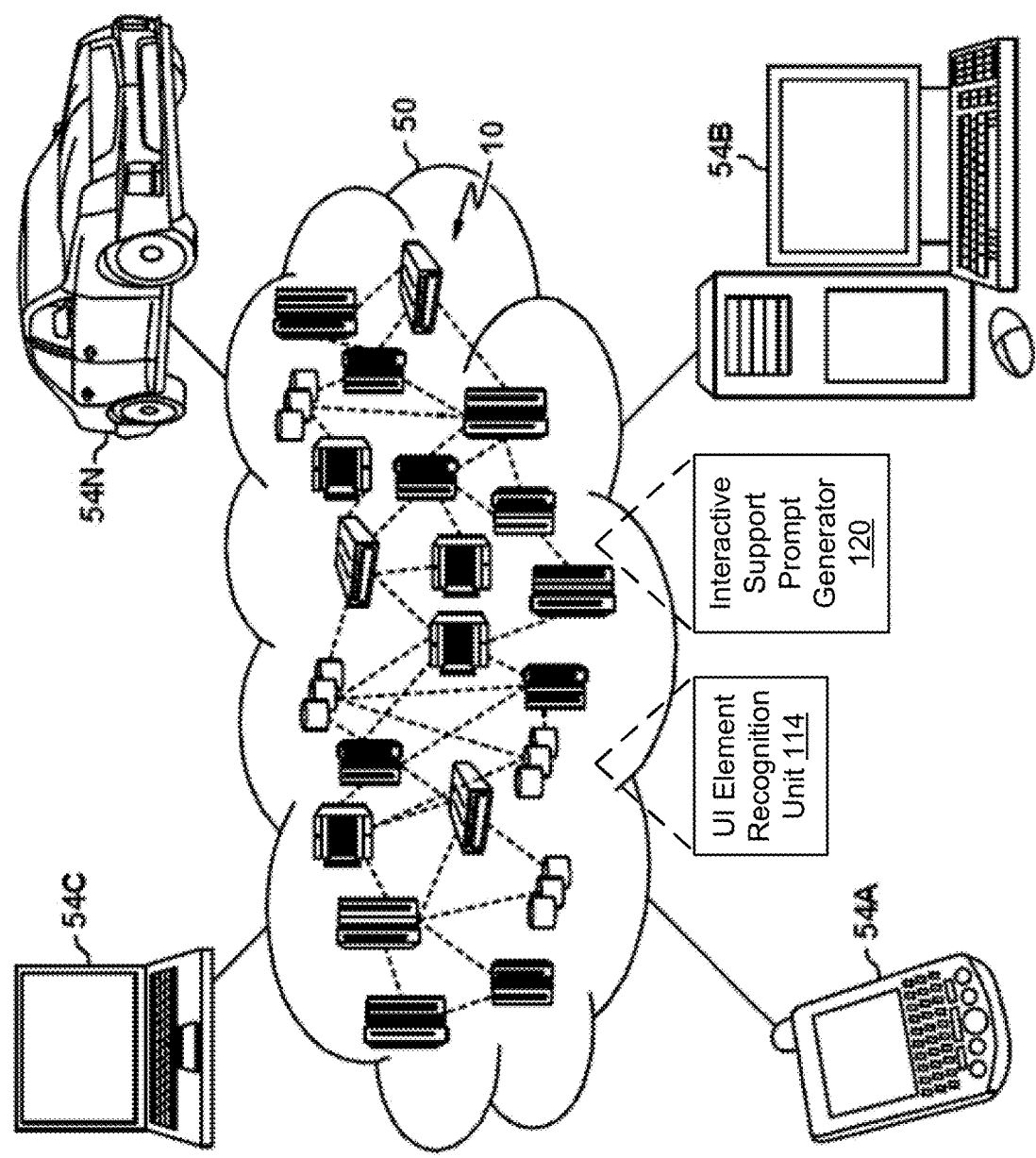
FIG. 7 depicts a cloud computing environment according to an embodiment of the present invention.

Referring to FIG. 7, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. One or more of the nodes 10 may include components described with reference to FIG. 1, including but not limited to the user interface element recognition unit 114 and/or the interactive support prompt generator 120. The user interface element recognition unit 114 and/or the interactive support prompt generator 120 may correspond to infrastructure, platforms, and/or software provided as services by the cloud computing environment 50.

Nodes 10 may communicate with one another. They may be grouped (not shown) physically or virtually, in one or more networks, such as Private, Community, Public, or Hybrid clouds as described hereinabove, or a combination thereof. This allows the cloud computing environment 50 to offer infrastructure, platforms and/or software as services for which a cloud consumer does not need to maintain resources on a local computing device.

The user interface element recognition unit 114 and/or the interactive support prompt generator 120 may operate as further described with reference to FIGS. 1-6. The types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
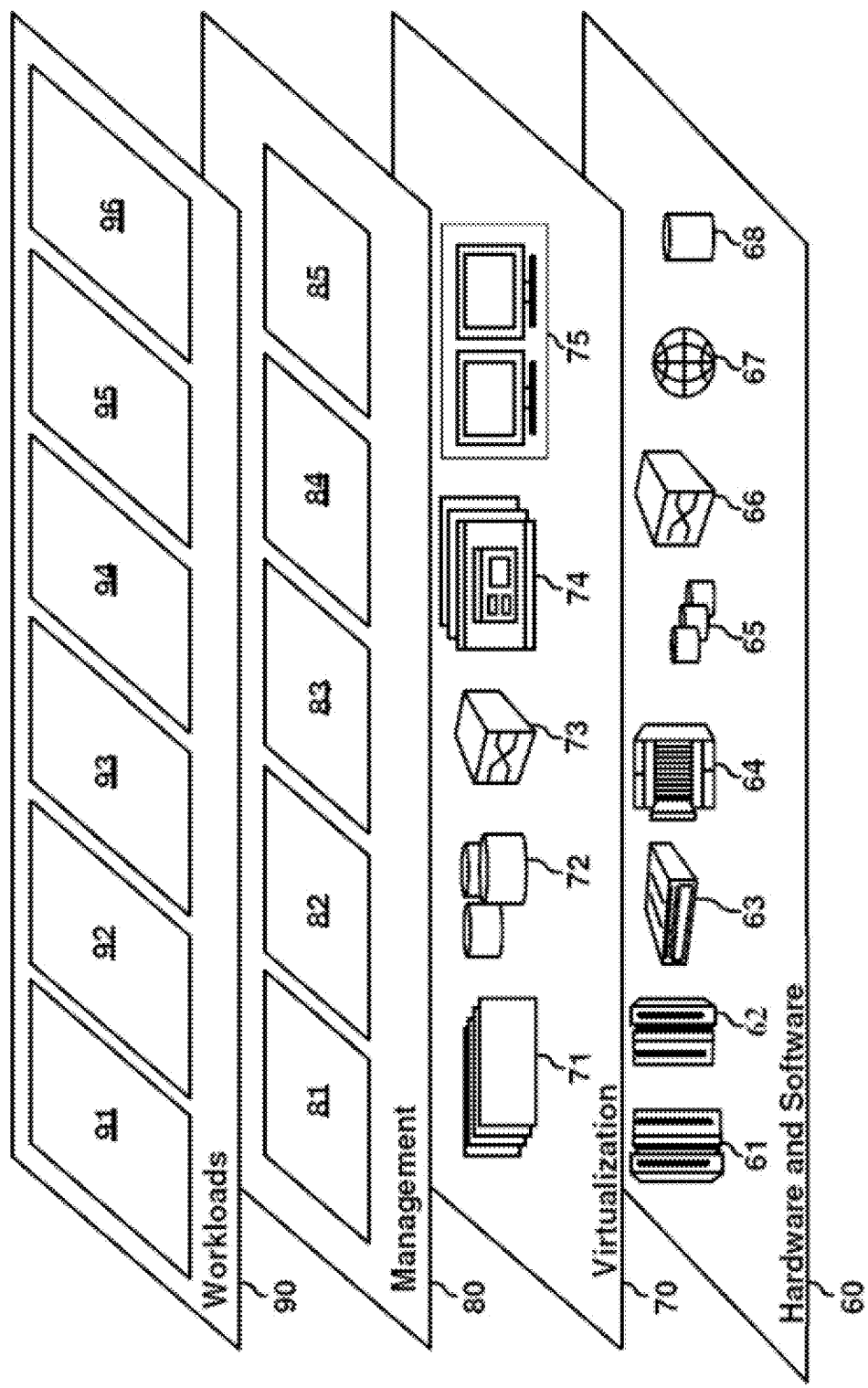
FIG. 8 depicts abstraction model layers according to an embodiment of the present invention.

Referring to FIG. 8, a set of functional abstraction layers provided by cloud computing environment 50 (FIG. 7) is shown. One or more of the abstraction layers provide functionality of the user interface element recognition unit 114 and/or the interactive support prompt generator 120 of FIG. 1, as described herein. It should be understood in advance that the components, layers, and functions shown in FIG. 8 are intended to be illustrative only and aspects of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide functions described herein. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated interactive support 96. In a particular aspect, the automated interactive 96 may include automatic analysis of user interface elements to generate support prompts, such as for use by an automatically generated chat-bot, as described herein with reference to FIGS. 1-6.

The present invention may be a system, a method, and/or a computer program product at any possible technical detail level of integration. The computer program product may include a computer readable storage medium (or media) having computer readable program instructions thereon for causing a processor (or controller) to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or eight source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other devices implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A computer-implemented method comprising:
    capturing, by one or more processors, a snapshot of content of a web page displayed at a user interface screen, the web page of a website that does not utilize an automated interactive support service;
    prior to receiving a user query, generating, by one or more processors, an automated interactive support prompt based on an analysis of the captured snapshot, wherein generating the automated interactive support prompt based on the analysis of the captured snapshot comprises:
        identifying, by one or more processors, a domain of the web page from the content in the captured snapshot;
        analyzing, by one or more processors, the captured snapshot to identify a plurality of user interface elements within the captured snapshot, wherein a respective user interface element is associated with an action for a user to perform; and
        determining, by one or more processors, a phrase based on: i) the domain and (ii) the respective user interface element that is associated with the action for the user to perform; and
    displaying the automated interactive support prompt as an overlay on the web page at the user interface screen, the automated interactive support prompt comprising the phrase and a mechanism for the user to respond to the phrase.

2. The computer-implemented method of claim 1, wherein the automated interactive support prompt is a virtual chat-bot.

3. The computer-implemented method of claim 1, wherein analyzing the captured snapshot to identify the plurality of user interface elements within the content in the captured snapshot comprises:
    accessing, by one or more processors, at least one user interface element recognition model that is trained to recognize user interface elements; and
    inputting, by one or more processors, the snapshot into the at least one user interface element recognition model to identify the plurality of user interface elements.

4. The computer-implemented method of claim 1, further comprising:
    identifying, by one or more processors, the action for the user to perform based on:
        accessing, by one or more processors, at least one model that is trained to recognize user interface element actions; and
        inputting, by one or more processors, the respective user interface element into the at least one model to identify the action for the user to perform.

5. The computer-implemented method of claim 1, wherein determining the phrase comprises:

parsing, by one or more processors, a plurality of scripts to generate a plurality of phrases;

selecting, by one or more processors, a sample phrase from the plurality of phrases based on the respective user interface element that is associated with the action for the user to perform; and modifying, by one or more processors, the sample phrase based on the domain to generate the phrase.

6. The computer-implemented method of claim 5, wherein the plurality of phrases comprises a selection from the group consisting of: a website script and a user interface application script.

7. The computer-implemented method of claim 1, wherein the domain is associated with a service selected from the group consisting of: booking a flight, booking a hotel, booking a rental car, and ordering food.

8. The computer-implemented method of claim 1, further comprising:
generating, by one or more processors, a second automated interactive support prompt in response to receiving a user interaction; and
displaying, by one or more processors, the second automated interactive support prompt at the user interface screen.

9. The computer-implemented method of claim 8, wherein generating the second automated interactive support prompt comprises:
identifying, by one or more processors, based on analyzing the captured snapshot, a second user interface element of the plurality of user interface elements;
determining, by one or more processors, a second action associated with the second user interface element;
determining, by one or more processors, a second phrase based on: (i) the received user interaction, (ii) the domain, (iii) the second user interface element, and (iv) the second action; and
generating; by one or more processors, the second automated interactive support prompt, the second automated interactive support prompt comprising the second phrase.

10. The computer-implemented method of claim 1, wherein:
the action for the user to perform is selected from the group consisting of: selecting a single item from among a group of pre-defined items, selecting a task, selecting from among one or more attributes, inputting at least one attribute via an entry prompt, and inputting a string of text via an entry prompt; and
the one or more attributes comprise a rating value.

11. The computer-implemented method of claim 1, wherein capturing the snapshot of the content of the web page displayed at the user interface screen further comprises:
capturing, by one or more processors, a portion of source code corresponding to the web page.

12. The computer-implemented method of claim 1, wherein capturing the snapshot of content of the web page displayed at the user interface screen comprises performing, by one or more processors, a screenshot operation to capture the snapshot of the web page displayed a the user interface screen.

13. An apparatus comprising:
a memory;
a user interface screen configured to display content of a web page of a website that does not utilize an automated interactive support service, the web page associated with a domain for a particular service; and a controller coupled to the memory and to the user interface screen, the controller configured to:
capture a snapshot of the content displayed at the user interface screen;
prior to receiving a user query, generate an automated interactive support prompt based on an analysis of the captured snapshot, wherein generating the automated interactive support prompt based on the analysis of the captured snapshot comprises:
identifying a domain of the web page from the content in the captured snapshot;
analyzing the captured snapshot to identify a plurality of user interface elements within the captured snapshot, wherein a respective user interface element is associated with an action for a user to perform; and
determining a phrase based on: (i) the domain and (ii) the respective user interface element that is associated with the action for the user to perform; and
displaying the automated interactive support prompt as an overlay on the web page at the user interface screen, the automated interactive support prompt comprising the phrase and a mechanism for the user to respond to the phrase.

14. The apparatus of claim 13, wherein the automated interactive support prompt is a virtual chat-bot.

15. A computer program product comprising:
one or more computer readable storage media, and program instructions collectively stored on the one or more computer readable storage media, the program instructions comprising:
program instructions to capture a snapshot of content of a web page displayed at a user interface screen, the web page of a website that does not utilize an automated interactive support service;
program instructions to, prior to receiving a user query, generate an automated interactive support prompt based on an analysis of the captured snapshot, wherein the program instructions to generate the automated interactive support prompt based on the analysis of the captured snapshot comprise:
program instructions to identify a domain of the web page from the content in the captured snapshot;
program instructions to analyze the captured snapshot to identify a plurality of user interface elements within the captured snapshot, wherein a respective user interface element is associated with an action for a user to perform; and
program instructions to determine a phrase based on: (i) the domain and (ii) the respective user interface element that is associated with the action for the user to perform; and
program instructions to display the automated interactive support prompt as an overlay on the web page at the user interface screen, the automated interactive support prompt comprising the phrase and a mechanism for the user to respond to the phrase.

16. The computer program product of claim 15, wherein the automated interactive support prompt is a virtual chat-bot.

17. The computer program product of claim 15, wherein the program instructions further comprise:
program instructions, collectively stored on the one or more computer readable storage media, to generate a second automated interactive support prompt in response to receiving a user interaction; and program instructions, collectively stored on the one or more computer readable storage media, to display the second automated interactive support prompt at the user interface screen.

18. The computer program product of claim 15, wherein the domain is associated with a service selected from the group consisting of: booking a flight, booking a hotel, booking a rental car, and ordering food.

* * * * *